(12) United States Patent
Johnson

(10) Patent No.: US 6,808,833 B2
(45) Date of Patent: Oct. 26, 2004

(54) FUEL SUPPLY FOR A FUEL CELL

(75) Inventor: Loren E. Johnson, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 495 days.

(21) Appl. No.: 10/056,175

(22) Filed: Jan. 22, 2002

(65) Prior Publication Data

US 2003/0136453 A1 Jul. 24, 2003

(51) Int. Cl.[7] .................................................. H01M 8/18
(52) U.S. Cl. ........................................... 429/19; 429/34
(58) Field of Search ............................ 429/17, 19, 34; 48/178

(56) References Cited

U.S. PATENT DOCUMENTS

| 4,771,295 | A | | 9/1988 | Baker et al. ................. 346/1.1 |
|---|---|---|---|---|
| 4,791,438 | A | | 12/1988 | Hanson et al. .......... 346/140 R |
| 4,794,409 | A | | 12/1988 | Cowger et al. ......... 346/104 R |
| 5,010,354 | A | | 4/1991 | Cowger et al. ......... 346/140 R |
| 5,969,736 | A | | 10/1999 | Field et al. .................... 347/85 |
| 6,041,762 | A | * | 3/2000 | Sirosh et al. ................ 123/529 |
| 6,447,945 | B1 | * | 9/2002 | Streckert et al. .............. 429/34 |
| 6,610,433 | B1 | * | 8/2003 | Herdeg et al. ................ 429/17 |

FOREIGN PATENT DOCUMENTS

| WO | WO 02/099916 | 12/2002 |
|---|---|---|
| WO | WO 03/043112 | 5/2003 |

* cited by examiner

Primary Examiner—Bruce F. Bell

(57) ABSTRACT

A fuel supply for a fuel cell is provided. The fuel supply comprises a fuel storage area, a fuel outlet configured to pass fuel from the fuel storage area, and a backpressure regulator configured to maintain a lowered pressure within the fuel storage area relative to atmospheric pressure outside of the fuel storage area when fuel is not being transferred to the fuel cell.

24 Claims, 3 Drawing Sheets

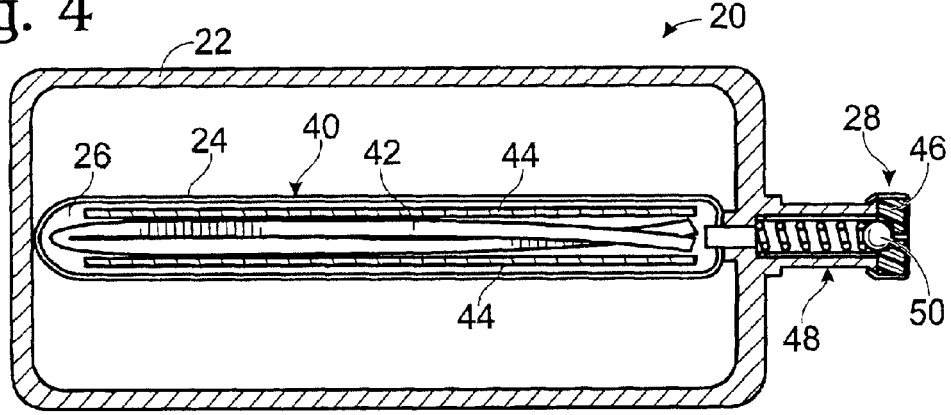
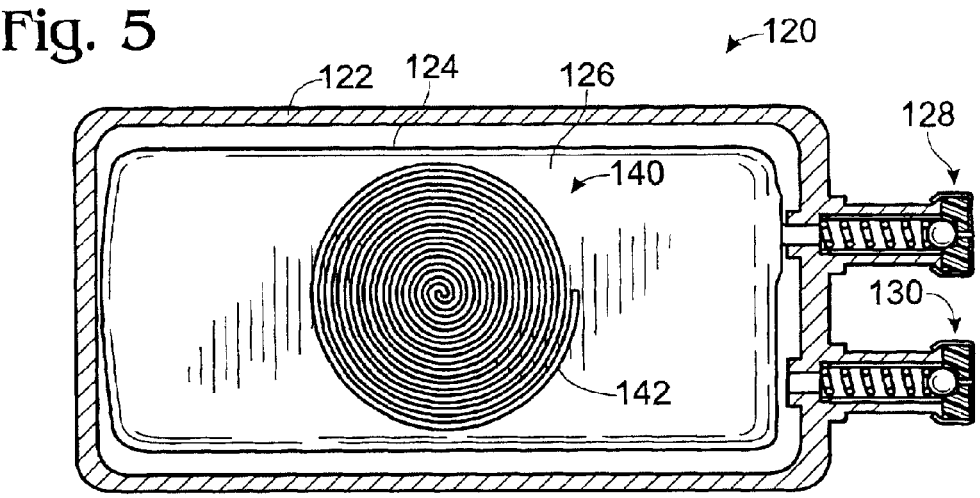
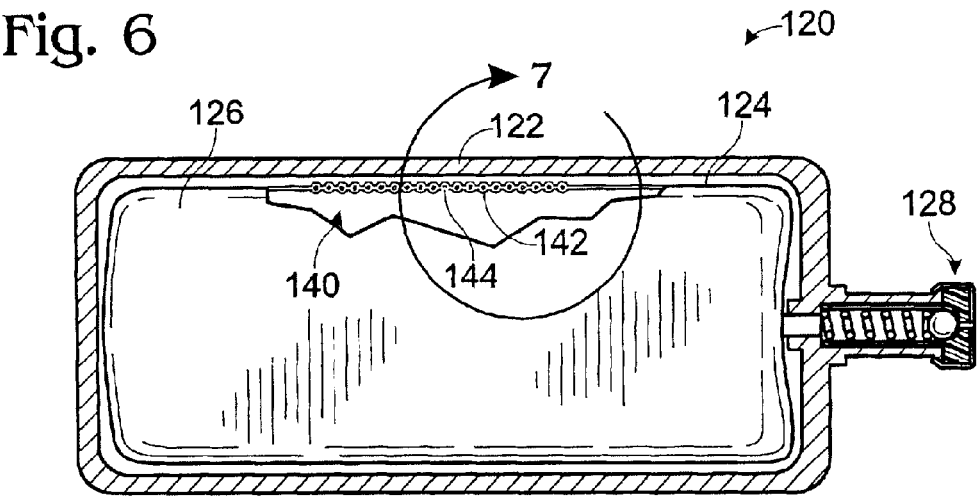

US 6,808,833 B2

FUEL SUPPLY FOR A FUEL CELL

TECHNICAL FIELD

The present invention relates to a fuel supply for a fuel cell. More particularly, the invention provides a fuel supply configured to maintain a lowered backpressure across a fuel outlet.

BACKGROUND OF THE INVENTION

Fuel cells in general, and hydrogen fuel cells in particular, have received increased interest as possible power supplies for portable electronic devices. A fuel cell is an electrochemical device for continuously converting chemicals into direct-current electricity. A fuel cell typically includes an anode and a cathode separated by an ionic-conducting electrolyte, and also any necessary systems for moving fuel into the cell or waste out of the cell. Fuel is continuously fed to one of the electrodes, and a reactant is fed to the other electrode. Electrons participating in the reaction flow from one electrode to the other via an external circuit, thus powering an attached device.

In a hydrogen fuel cell, hydrogen gas is fed to the anode, and oxygen is fed to the cathode. At the anode, the hydrogen gas is oxidized to $H^+$ ions. The hydrogen ions travel through the electrolyte to the cathode, while electrons from the oxidation reaction travel through an external circuit to the cathode. At the cathode, the electrons reduce oxygen atoms, which then react with the hydrogen ions to form water as a waste product.

Fuel cells in general, and hydrogen fuel cells in particular, offer several advantages over traditional batteries. First, unlike batteries, a fuel cell produces electricity from fuels that are fed to the fuel cell only as needed. Therefore, the life of the fuel cell is theoretically unlimited, requiring only that the fuel supply be periodically replenished or replaced. This allows a fuel cell to be installed as a permanent part of a portable device, with provision for a refillable or replaceable fuel supply. Second, because hydrogen fuel cells produce water as a waste product, the use of fuel cells presents fewer environmental concerns than batteries, which generally contain hazardous chemicals such as heavy metals or acids. Third, the output voltage of fuel cells remains generally constant throughout the life of the fuel cell, as opposed to a battery, which may suffer from reduced output voltage over the course of the battery lifetime.

A fuel cell may use a fuel in any form, solid, liquid or gas. For example, either compressed hydrogen gas or cryogenic liquid hydrogen could be used to power a hydrogen fuel cell. However, these sources may be expensive and dangerous to use. A more convenient source of fuel for a hydrogen fuel cell may be a chemical (or a solution of a chemical) with easily oxidizable protons, such as methanol, or one that releases hydrogen gas in the presence of a catalyst, such as a borohydride solution. Because these fuels are relatively safe and easy to use and to store at room temperature, they may be used in disposable or rechargeable fuel supplies.

While methanol or borohydride (or similar) fuel supplies may be convenient to use, they may also pose some problems. For example, the expansion of gases inside the fuel supply caused by changes in atmospheric pressure may force fuel through the interface at which the fuel supply couples to the fuel cell. This leakage may contaminate the electronics in the portable device, possibly causing device failure, or may leak out of the device and pose a safety concern.

SUMMARY OF THE INVENTION

The present invention provides a fuel supply for a fuel cell. The fuel supply includes a fuel storage area, a fuel outlet configured to pass fuel from the fuel storage area, and a backpressure regulator configured to maintain a lowered pressure within the fuel storage area relative to atmospheric pressure outside of the fuel storage area when fuel is not being transferred to the fuel cell.

BRIEF DESCRIPTION OF THE DRAWINGS

FIG. 4 is a side sectional view of the fuel supply of FIG. 2, with an emptied fuel storage area.

FIG. 5 is a top sectional view of a second embodiment of a fuel supply according to the present invention.

FIG. 6 is a side sectional view of the fuel supply of FIG. 5.

DETAILED DESCRIPTION OF THE PREFERRED EMBODIMENTS

Figure 1:
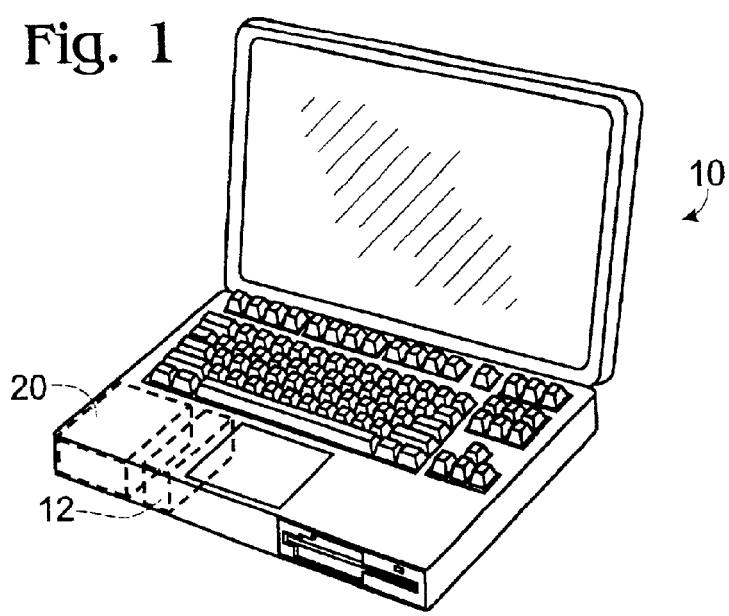
FIG. 1 is an isometric view of a portable computer, with an example placement of a fuel supply according to one embodiment of the present invention shown in dashed lines.

The present invention provides a fuel supply configured to be removably coupled to a fuel cell to power a portable electronic device. An example device is shown generally at 10 in FIG. 1 as a laptop computer. An example placement of a fuel cell in the device is shown schematically at 12, and an example placement of a fuel supply is shown schematically at 20. The electronic device will typically include a receptacle (not shown) configured to allow a user to easily insert or remove fuel supply 20. While the depicted fuel supply is shown in the context of a laptop computer, it will be appreciated that a fuel supply according to the present invention may be configured for use in any other desired fuel cell powered device, large or small.

Figure 2:
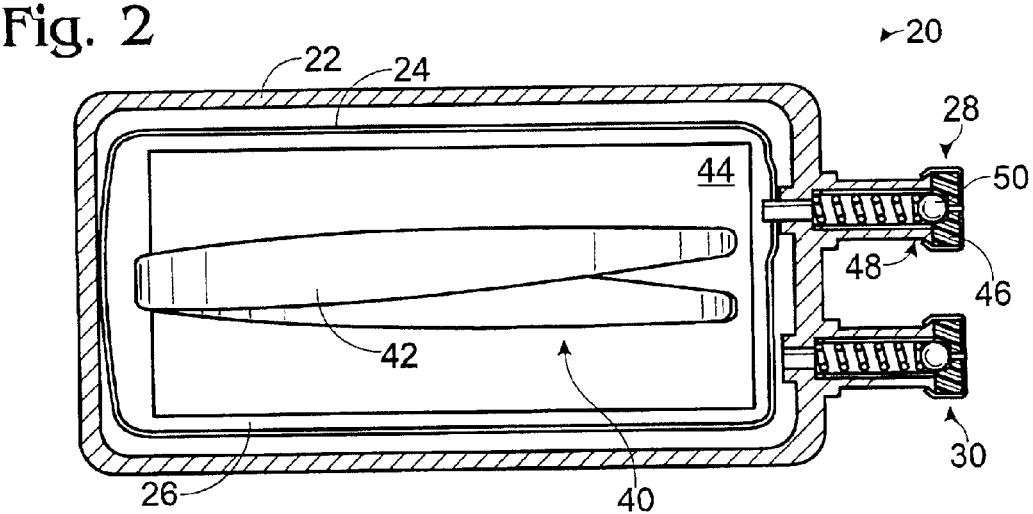
FIG. 2 is a top sectional view of a first embodiment of a fuel supply according to the present invention.
Figure 3:
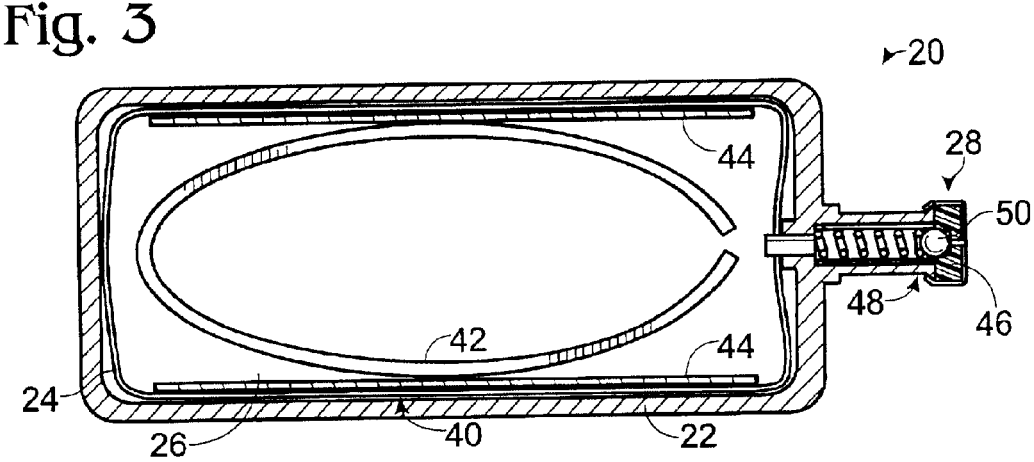
FIG. 3 is a side sectional view of the fuel supply of FIG. 2, with a full fuel storage area.

FIGS. 2–4 show the construction of fuel supply 20 in more detail. Fuel supply 20 includes an outer casing 22, and an inner fuel container 24 that encloses a fuel storage area 26. Fuel container 24 is configured to hold a liquid fuel supply, such as a borohydride or methanol solution, and is typically constructed from a material inert to the fuel solution. Fuel supply 20 also includes a fuel outlet 28 configured to pass fuel out of fuel storage area 26. Furthermore, fuel supply 20 may also include an inlet valve 30 configured to pass air or fuel cell waste into outer container 22 to compensate for the loss of fuel volume caused by the consumption of fuel by the fuel cell. Finally, fuel supply 20 includes a backpressure regulator 40 configured to maintain a backpressure at the interface between fuel outlet 28 and the fuel cell.

Backpressure regulator 40 is configured to maintain pressure within the interior of fuel container 24 at a slightly lower level than the pressure outside of the fuel container, which creates a backpressure at fuel outlet 28. Maintaining a backpressure at fuel outlet 28 helps to prevent fuel from leaking out of fuel storage area 26 when fuel supply 20 is installed in a device but is not in use. Furthermore, maintaining a backpressure may also help to prevent fuel from being pushed out of fuel storage area 26 when the device is subject to changes in atmospheric pressure. The backpressure typically will have a magnitude of 0.2 to 0.25 inches of water.

Backpressure regulator 40 may utilize any suitable mechanism for maintaining a backpressure at fuel outlet 28. For example, in the embodiment depicted in FIGS. 2–4, backpressure regulator 40 includes a spring 42 disposed within fuel storage area 26. Spring 42 is configured to push against the interior walls of fuel container 24 to create a slightly lower pressure within the fuel storage area compared to the pressure outside of the fuel storage area. Spring 42 typically exerts a very light pressure on the walls of fuel container 24 to avoid interfering with the removal of fuel from the fuel container. In the depicted embodiment, spring 42 is a bow spring, but other suitable types of spring, such as a coil spring or a leaf spring, may be used without departing from the scope of the present invention.

Spring 42 may be configured to push directly against the interior walls of fuel container 24 if desired. However, if the walls of fuel container 24 are flexible, this may cause the walls of the fuel container to distort, and thus may cause the magnitude of the backpressure to vary over the lifetime of the fuel supply. Therefore, backpressure regulator 40 may also include a pressure distribution mechanism to distribute pressure from spring 42 more evenly across the interior walls of fuel container 24. Any suitable pressure distribution mechanism may be used. For example, the interior walls of fuel container 24 may include stiffening members that prevent them from distorting. In the depicted embodiment, generally rigid plates 44 are located where spring 42 pushes against the interior walls of fuel container 24. Plates 44 may be attached to spring 42, to the interior walls of fuel container 24, or may float freely between the spring and the fuel container walls. Furthermore, plates 44 may be of any suitable size. It may be desirable for plates 44 to have a relatively larger size to distribute the pressure across the interior walls of fuel container 24 more evenly.

The operation of backpressure regulator 40 is demonstrated in FIGS. 3–4. Initially, as shown in FIG. 3, fuel storage area 26 is full of fuel and occupies most of the interior volume of outer container 22. Spring 42 is thus in a somewhat relaxed state. However, as fuel is removed from fuel storage area and either air or fuel cell waste is introduced into the space between outer container 22 and fuel container 24, the walls of the fuel container are collapsed inwardly by the loss of fluid from inside the fuel container and the pressure from the introduced air or waste. Spring 42 resists this pressure slightly, thus preventing fuel from being pushed out of fuel outlet 28 by the pressure. The continued removal of fuel from fuel container 24 causes spring 42 to be compressed further. Thus, once fuel container 24 has been virtually emptied of fuel, spring 42 will be compressed into a generally flat configuration, as shown in FIG. 4.

While the spring is shown positioned inside of fuel container 24 in the depicted embodiment, the spring also may be positioned in any other suitable arrangement relative to the fuel container. For example, the spring may be positioned adjacent the outside wall of fuel container 24 and attached to the fuel container in such a manner as to pull the walls of the fuel container outwardly, or may be built directly into the walls of the fuel container.

Any suitable mechanism may be used to transfer fuel from fuel supply 20 to a fuel cell. For example, fuel supply 20 may contain a small mechanical pumping mechanism (not shown) to pump fuel toward a fuel cell, or fuel may be removed by the pressure reduction caused by the consumption of fuel in the fuel cell. Likewise, any suitable valve may be used for fuel outlet 28 and inlet valve 30. In the depicted embodiment, fuel outlet 28 and inlet valve 30 each include redundant septum 46 and ball-and-spring valve 48 systems. Septum 46 and ball-and-spring valve 48 each serve as a barrier to keep fluid from leaking out of, or air from leaking into, fuel outlet 28 and inlet valve 30 while fuel supply 20 is not connected to a fuel cell. To open these valves, the fuel cell interface (not shown) on the electronic device will have a hollow needle corresponding to each of fuel outlet 28 and inlet valve 30. Insertion of fuel supply 20 into this interface will cause the needles to penetrate septums 46 and displace the valve balls 50 of ball-and-spring valves 48, allowing fluid to flow through the hollow centers of the needles, and thus through the interface.

Figure 7:
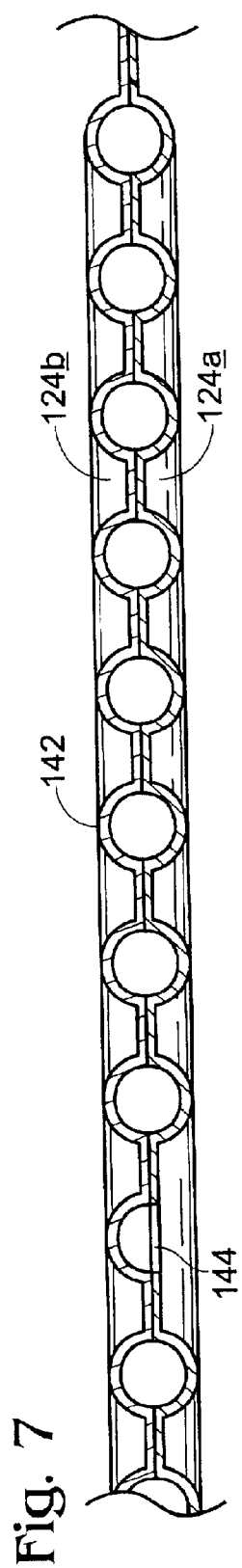
FIG. 7 is a somewhat magnified, sectional view of the capillary element of the fuel supply of FIG. 5.

FIGS. 5–7 show generally, at 120, a second embodiment of a fuel supply according to the present invention. Fuel supply 120 includes an outer casing 122, an inner fuel container 124 enclosing a fuel storage area 126, a fuel outlet 128, and an inlet valve 130 typically configured to pass either air or fuel cell waste into the space between outer casing 122 and fuel storage area 124. Additionally, fuel supply 120 includes a backpressure regulator 140 for maintaining a slight backpressure at fuel outlet 128.

The backpressure regulator 140 depicted in FIGS. 5–7 takes the form of a capillary element 142 disposed in the wall of fuel container 124. As best shown in FIGS. 6–7, capillary element 142 includes an opening 144 that opens into fuel container 124, allowing a small amount of fuel to be drawn into the capillary element by capillary action. The slight suction created by the capillary action creates a slightly reduced pressure inside of fuel storage area 124 relative to the outside environment, helping to prevent fuel from seeping out of fuel outlet 128 when the fuel cell is not in use. The material from which fuel container 124 is made may be chosen to achieve a desired degree of chemical interaction between the fuel and the fuel container, and thus to tailor the strength of the capillary interaction between the fuel solution and capillary element 142. Examples of suitable materials include polymers such as polyethylene, polypropylene, polysulfone, polyvinyl chloride, polyvinylidene, PET, PETE, and mixtures and/or copolymers thereof. Furthermore, the polymers may be filled with materials such as glass, talc, carbon, or a metal material such as aluminum, steel, brass, or other common metals or metal alloys.

Capillary element 142 may have any suitable configuration that is capable of creating a backpressure via capillary action, and may include capillary structures positioned either inside or outside of fuel storage area 126. For example, capillary element 142 may include a capillary structure contained within fuel storage area 126 floating freely in the fuel. Alternatively or additionally, capillary element 142 may include a capillary structure disposed within the space between outer container 122 and fuel container 124, where the structure has an opening to fuel storage area 126. In the depicted embodiment, capillary element 142 is a spiral-shaped tube formed in the wall of fuel container 124. It will be appreciated, of course, that capillary element 142 may take any of a variety of forms.

FIG. 7 shows one possible construction of capillary element 142. In the depicted embodiment, fuel container 124 is formed from two layers of material, an inner layer 124*a* and an outer layer 124*b*. A first portion of capillary element 142 is molded into inner layer 124a, and a second portion of capillary element is molded into outer layer 124b. Capillary element 142 is thus formed by fusing or otherwise joining bottom layer 124a to top layer 124b. The use of a spiral shape allows capillary element 142 to be made a relatively long length in relation to the space taken by the capillary element in the wall of fuel container 124. Again, it will be appreciated that, although the embodiment depicted in FIGS. 5–7 has only a single capillary element, a fuel supply according to the present invention may have any desired number of capillary elements without departing from the scope of the present invention.

Capillary element 142 may also help to prevent fuel from seeping out of fuel outlet 128 during changes in atmospheric pressure. During manufacturing, the pressure within capillary element 142 may be set at a level initially somewhat below atmospheric pressure. When fuel container 124 is filled with fuel and sealed, the lowered pressure in capillary element 142 will cause some fuel to be pushed into the capillary element to equalize the pressures inside of capillary element 142 and inside of fuel container 124. In this situation, capillary element 142 will be partially filled with fuel during ordinary use. If the atmospheric pressure increases or decreases during the lifetime of the fuel supply, the expansion or contraction of air within the unfilled portion of capillary element 142 may cause fuel to flow into or out of the capillary element to compensate for the pressure changes, rather than pushing fuel out of fuel outlet 128.

Figures 8, 9:
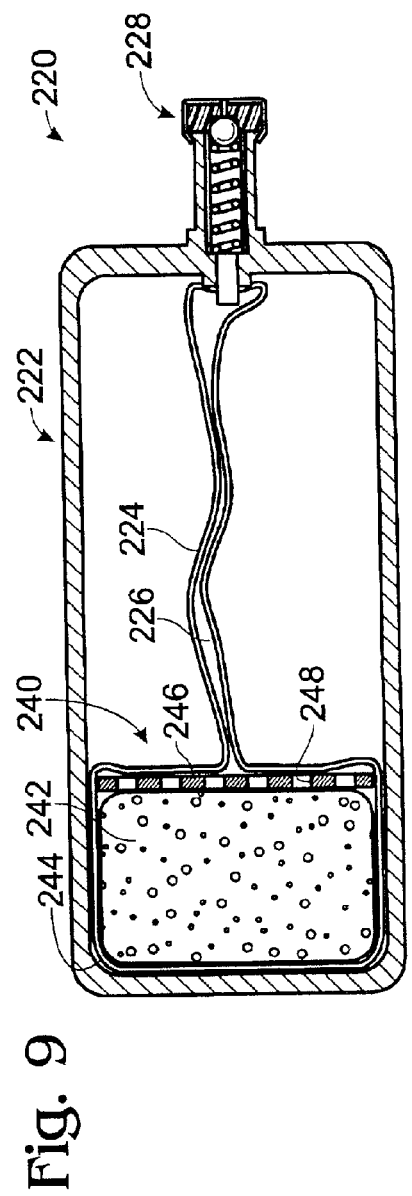
FIG. 8 is a side sectional view of a third embodiment of a fuel supply according to the present invention, with a full fuel storage area.
FIG. 9 is a side sectional view of the fuel supply of FIG. 8, with an emptied fuel storage area.

FIGS. 8 and 9 show generally, at 220, a third embodiment of a fuel supply according to the present invention. Like fuel supplies 20 and 120, fuel supply 220 includes an outer container 222, an inner fuel container 224 that encloses a fuel storage area 226, a fuel outlet 228, and an inlet (not shown) typically for passing either air or fuel cell waste into the space between outer container 222 and inner fuel container 224. Furthermore, fuel supply 220 also includes a backpressure regulator 240 disposed within fuel container 224. In the embodiment of FIGS. 8 and 9, however, backpressure regulator 240 takes the form of a foam element 242 in fluid communication with fuel contained within fuel storage area 226. Foam element 242 is typically formed at least partially from an open cell foam, and thus contains a plurality of narrow channels that act as capillaries to draw in fuel. This causes a slight suction that lowers the pressure within fuel container 224 relative to the pressure outside of fuel container 224, creating a backpressure at fuel outlet 228. Generally, at least some air must be present within foam element 242 to create the backpressure. This air could be provided by preloading foam element 242 with a certain amount of air during the manufacturing process.

Any suitable type of foam may be used for foam element 242. The foam may be chosen based upon the desired degree of chemical interaction between the fuel and foam element 242 to tailor the magnitude of the capillary interaction between the fuel and the foam. Examples of suitable foams include polyurethane and polyamide.

Foam element 242 may be fluidly connected to fuel storage area 226 in any desired manner. For example, foam element 242 may be positioned within fuel container 224 such that it is in contact with fuel on multiple sides. However, it may be preferable to segregate foam element 242 in a separate compartment 244 within fuel storage area 226, as shown in FIGS. 8–9. In this configuration, one or more sides of foam element 242 are in direct contact with the inside wall of inner container 222. This seals the ends of some of the capillary channels created by the open-celled structure of foam element 242, and thus may trap some air within foam element 242, allowing fuel to flow into or out of the foam element to compensate for the pressure changes. In the depicted embodiment, foam element 242 is contained within a rear portion 244 of fuel container 224.

Foam element 242 is separated from fuel storage area 226 by a divider 246. Divider 246 includes one or more channels 248 through which fuel may flow to reach foam element 242. Channels 248 may be configured to draw fuel toward foam element 242 by capillary action, or may be large enough to allow fuel to flow freely into contact with the foam element.

Operation of fuel supply 220 is also shown in FIGS. 8–9. As fuel is removed from fuel container 224, fuel storage area 226 decreases in volume. However, foam element 242 will typically resist collapse as fuel is withdrawn from fuel storage area 226. Therefore, the volume and shape of rear portion 244 of fuel container 224 may remain generally unchanged during the collapse of fuel storage area 226.

Like capillary element 142, foam element 242 may also help to prevent fuel from seeping out of fuel outlet 128 during changes in atmospheric pressure. During manufacturing, the pressure within foam element 242 may be set at a level initially somewhat below atmospheric pressure. When fuel container 224 is filled with fuel and sealed, the lowered pressure in foam element 242 will cause some fuel to be pushed into the foam element to equalize the pressures inside of foam element 242 and inside of fuel container 224. In this situation, foam element 242 will be partially filled with fuel during ordinary use. If the atmospheric pressure increases or decreases during the lifetime of the fuel supply, the expansion or contraction of air within the unfilled portion of foam element 242 may cause fuel to flow into or out of the foam element to compensate for the pressure changes, rather than pushing air out of fuel outlet 228.

The disclosure set forth above encompasses multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious and directed to one of the inventions. These claims may refer to "an" element or "a first" element or the equivalent thereof; such claims should be understood to include incorporation of one or more such elements, neither requiring nor excluding two or more such elements. Inventions embodied in other combinations and subcombinations of features, functions, elements, and/or properties may be claimed through amendment of the present claims or through presentation of new claims in this or a related application. Such claims, whether directed to a different invention or to the same invention, and whether broader, narrower, equal, or different in scope to the original claims, also are regarded as included within the subject matter of the inventions of the present disclosure.

I claim:

1. A fuel supply for a fuel cell, comprising:
   a fuel storage area;
   a fuel outlet configured to pass fuel from the fuel storage area; and a backpressure regulator configured to maintain a lowered pressure within the fuel storage area relative to atmospheric pressure outside of the fuel storage area when fuel is not being transferred to the fuel cell.

2. The fuel supply of claim 1, the fuel storage area being bounded by a flexible container that collapses as fuel is drawn from the fuel storage area, wherein the backpressure regulator includes a biasing element configured to bias the container against collapse to maintain a backpressure across the fuel outlet.

3. The fuel supply of claim 2, wherein the biasing element is a spring.

4. The fuel supply of claim 2, the flexible container having a wall, wherein the biasing element is disposed within the flexible container and pushes the wall of the flexible container outwardly.

5. The fuel supply of claim 4, wherein the backpressure regulator includes at least one plate disposed between the biasing element and the wall of the flexible container such that the biasing element is configured to push the plate against the wall.

6. The fuel supply of claim 2, the flexible container having a wall, wherein the biasing element is disposed outside of the fuel storage area and is configured to pull against the wall of the flexible container to bias the flexible container against collapse.

7. The fuel supply of claim 1, wherein the backpressure regulator includes a capillary element having an interior, the capillary element being configured to draw a volume of fuel from the fuel storage area into the interior to create a backpressure across the fuel outlet.

8. The fuel supply of claim 7, wherein the capillary element includes an elongate tube in fluid communication with the fuel storage area.

9. The fuel supply of claim 8, the fuel storage area being bounded by a fuel container having a wall, wherein the elongate tube is formed in the wall of the fuel container.

10. The fuel supply of claim 7, wherein the capillary element includes a foam element in fluid communication with the fuel storage area.

11. The fuel supply of claim 10, wherein the foam is an open cell foam.

12. A fuel supply for a fuel cell, comprising:
a fuel storage area enclosed by a fuel container;
a fuel outlet disposed on the fuel container, the fuel outlet configured for coupling with the fuel cell to pass fuel from the fuel storage area to the fuel cell; and
a backpressure regulator disposed within the fuel container to cause fuel at the fuel outlet to tend to flow toward the fuel storage area when fuel is not being transferred to the fuel cell.

13. The fuel supply of claim 12, the fuel container having a wall, wherein the backpressure regulator includes a biasing element for biasing the wall of the fuel container outwardly.

14. The fuel supply of claim 13, wherein the biasing element includes a spring.

15. The fuel supply of claim 14, wherein the spring is disposed within the fuel container, wherein the biasing element includes at least one plate disposed between the spring and the wall of the fuel container, and wherein the spring is configured to push the plate against the wall of the fuel container.

16. The fuel supply of claim 12, wherein the backpressure regulator includes a capillary element configured to draw in fuel to create a backpressure across the fuel outlet.

17. The fuel supply of claim 16, wherein the capillary element includes at least one elongate tube.

18. The fuel supply of claim 17, wherein the elongate tube is formed in the wall of the fuel container.

19. The fuel supply of claim 17, wherein the elongate tube has a spiral configuration.

20. The fuel supply of claim 16, wherein the capillary element includes a foam element.

21. The fuel supply of claim 20, wherein the foam element is disposed within the fuel storage area.

22. The fuel supply of claim 20, wherein the foam element is separated from the fuel storage area and is in fluid connection with the fuel storage area via at least one channel.

23. A fuel supply for a fuel cell, comprising:
a fuel container configured to store fuel, the fuel container having a wall;
a fuel outlet disposed on the fuel container, the fuel outlet being configured to pass fuel from the fuel container to the fuel cell; and
a biasing element disposed within the fuel container, the biasing element being configured to bias the wall of the fuel container outwardly to form a backpressure across the fuel outlet.

24. A fuel cell including a fuel supply, the fuel supply comprising:
a fuel storage area;
a fuel outlet configured to pass fuel from the fuel storage area; and
a backpressure regulator configured to maintain a lowered pressure within the fuel storage area relative to atmospheric pressure outside of the fuel storage area when fuel is not being transferred to the fuel cell.

* * * * *